(12) United States Patent
Chang

(10) Patent No.: US 8,891,039 B2
(45) Date of Patent: Nov. 18, 2014

(54) DISPLAY MODULE

(75) Inventor: Se-In Chang, Yongin (KR)

(73) Assignee: Samsung Display Co., Ltd. (KR)

( * ) Notice: Subject to any disclaimer, the term of this patent is extended or adjusted under 35 U.S.C. 154(b) by 74 days.

(21) Appl. No.: 13/207,147

(22) Filed: Aug. 10, 2011

(65) Prior Publication Data
US 2012/0182499 A1    Jul. 19, 2012

(30) Foreign Application Priority Data

Jan. 17, 2011 (KR) .................. 10-2011-0004531

(51) Int. Cl.
G02F 1/13357 (2006.01)
F21V 7/22 (2006.01)
G02F 1/1335 (2006.01)
F21V 8/00 (2006.01)

(52) U.S. Cl.
CPC .... G02F 1/133609 (2013.01); G02F 1/133615 (2013.01); G02B 6/0088 (2013.01); G02B 6/009 (2013.01)
USPC .............. 349/65; 362/623; 362/629

(58) Field of Classification Search
CPC .............. G02F 1/133609; G02F 1/133615; G02B 6/009; G02B 6/0088
USPC .............. 349/64, 65; 362/607, 612, 615, 623, 362/624, 629
See application file for complete search history.

(56) References Cited

U.S. PATENT DOCUMENTS

| 3,893,166 | A  | * | 7/1975  | Pugsley ................. 358/523 |
| 6,406,159 | B1 | * | 6/2002  | Yamamoto ............. 362/627 |
| 6,976,780 | B2 |   | 12/2005 | Lee et al. |
| 2001/0050736 | A1 | * | 12/2001 | Lee et al. ............ 349/65 |
| 2002/0141173 | A1 |   | 10/2002 | Lee et al. |
| 2005/0275769 | A1 |   | 12/2005 | Roh et al. |
| 2006/0126359 | A1 | * | 6/2006 | Yao et al. ............. 362/615 |
| 2006/0187386 | A1 |   | 8/2006 | Roh |
| 2006/0291236 | A1 | * | 12/2006 | Hsu et al. ............. 362/561 |
| 2008/0089096 | A1 | * | 4/2008 | Lin et al. ............. 362/622 |
| 2008/0175022 | A1 | * | 7/2008 | Sugiura et al. ........ 362/609 |
| 2009/0103022 | A1 |   | 4/2009 | Roh et al. |
| 2010/0128194 | A1 | * | 5/2010 | Cho et al. ............. 349/58 |
| 2011/0013120 | A1 | * | 1/2011 | Sun et al. ............. 349/75 |
| 2011/0065826 | A1 | * | 3/2011 | Shimohara ............ 522/168 |
| 2011/0123722 | A1 | * | 5/2011 | Yang et al. ............ 427/511 |

FOREIGN PATENT DOCUMENTS

| KR | 2003-0006244 A | 1/2003 |
| KR | 10-2003-0025832 A | 3/2003 |
| KR | 10-2004-0021168 A | 3/2004 |

* cited by examiner

Primary Examiner — Dung Nguyen
Assistant Examiner — Tai Duong
(74) Attorney, Agent, or Firm — Knobbe, Martens, Olson & Bear LLP

(57) ABSTRACT

A display module includes a display panel configured to display an image and a backlight. The backlight includes a light guide panel configured to guide light to the display panel, a light source element configured to supply light to the light guide panel, and a reflection sheet disposed over the light guide panel, wherein a chromaticity compensation layer is formed in the backlight unit. The chromaticity compensation layer formed in the backlight reduces yellowing.

11 Claims, 5 Drawing Sheets

DISPLAY MODULE

CROSS-REFERENCE TO RELATED PATENT APPLICATION

This application claims the benefit of Korean Patent Application No. 10-2011-0004531, filed on Jan. 17, 2011, in the Korean Intellectual Property Office, the disclosure of which is incorporated herein in its entirety by reference.

BACKGROUND

1. Field

The present disclosure relates to display modules, and more particularly, to reducing yellowing of an image in a display module.

2. Description of the Related Art

Generally, a display panel such as a liquid crystal display panel is a passive display device that displays an image not by self-emitting light but by receiving external light.

In order for a liquid crystal display panel to be a self-emissive display, since a liquid crystal display module itself is not self-emissive, a back light unit is installed on a rear surface of the liquid crystal display panel to emit light. Accordingly, an image may be observed even in a dark place. The back light unit is used for a surface light source element, such as a light element for a light up sign, in addition to a passive display module, such as a liquid crystal display panel.

The backlight unit is classified as a direct light type or as an edge light type according to a position of a light source element. The direct light type backlight unit has a structure in which a plurality of light source elements disposed directly under a panel directly emit light on the panel. The edge light type backlight unit has a structure in which a plurality of light source elements disposed at a side of a light guide panel emit light and the emitted light is transmitted to a display panel through the light guide panel.

A light source element may be any of a cold cathode fluorescent lamp (CCFL), an external electrode fluorescent lamp (EEFL), a light emitting diode (LED), etc. The CCFL has a structure in which electrodes of both ends of a fluorescent lamp are formed inside a tube. The EEFL has a structure in which electrodes of both ends of a fluorescent lamp are formed outside of a tube. The LED has advantages, such as a compact size, low power consumption, and high reliability, and thus has been widely used as a light source element of a display module.

Recent passive display modules become thinner and larger, and a light guide panel manufactured to meet these trends has different characteristics. For example, in a light guide, yellowing of an image color gets worse at an area away from a portion on which light is incident. In particular, if a light guide panel is manufactured using an injection molding method, discoloration of a material of the light guide panel due to heat generated when manufacturing the light guide panel cannot be prevented, and if this discoloration is too intense, it is perceivable by the naked eye and thus product quality is deteriorated.

SUMMARY

One or more embodiments of the present invention provide display modules capable of minimizing yellowing that increases away from a portion of a light guide panel on which light emitted from a light source element is incident.

According to an aspect of the present invention, there is provided a display module comprising: a display panel configured to display an image; and a backlight including a light guide panel for guiding light to the display panel, a light source element for supplying light to the light guide panel, and a reflection sheet disposed over the light guide panel, wherein a chromaticity compensation layer is formed in the backlight unit.

The reflection sheet may be disposed over a rear surface of the light guide panel opposite to the display panel, and the chromaticity compensation layer may be interposed between the light guide panel and the reflection sheet.

The chromaticity compensation layer may be disposed directly on an upper surface of the reflection sheet facing the display panel.

The chromaticity compensation layer may comprise a blue pigment.

The blue pigment may comprise one of a phthalocyanine pigment, a mixture of a phthalocyanine pigment and a dioxazine pigment, and a mixture of cyan, violet, and magenta pigments.

The cyan pigment may comprise a phthalocyanine pigment, and the violet pigment may comprise a dioxazine pigment, and the magenta pigment may comprise a quinacridone pigment.

The reflection sheet may be formed of a polyethylene terephthalate.

The light guide panel may be formed of a polycarbonate.

The light source element may be disposed at a side portion of the light guide panel.

Another aspect of the invention provides a display module comprising: a display panel configured to display an image; and a backlight unit comprising a light guide panel configured to guide light to the display panel, a light source element configured to supply light to the light guide panel, and a reflection sheet disposed over a rear surface of the light guide panel opposite to the display panel, wherein the reflection sheet comprises a chromaticity compensation material. The light source is configured to supply light to a side of the light guide panel such that light beams from the light source travel in a horizontal direction through the light guide panel and that at least one color component of the light beams would be disproportionately absorbed while light beams are traveling in the horizontal direction. The backlight unit further comprises a reflection sheet disposed over a rear surface of the light guide panel opposite to the display panel, wherein the reflection sheet is configured such that the disproportionate absorption of the at least one color component of the light beams traveling therethrough is at least partially compensated.

A further aspect of the invention provides a display module comprising: a display panel configured to display an image; and a backlight comprising a light guide panel configured to guide light to the display panel, a light source element configured to supply light to the light guide panel, and a reflection sheet disposed over the light guide panel, wherein the light guide panel comprises a chromaticity compensation material.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS

Figure 1:
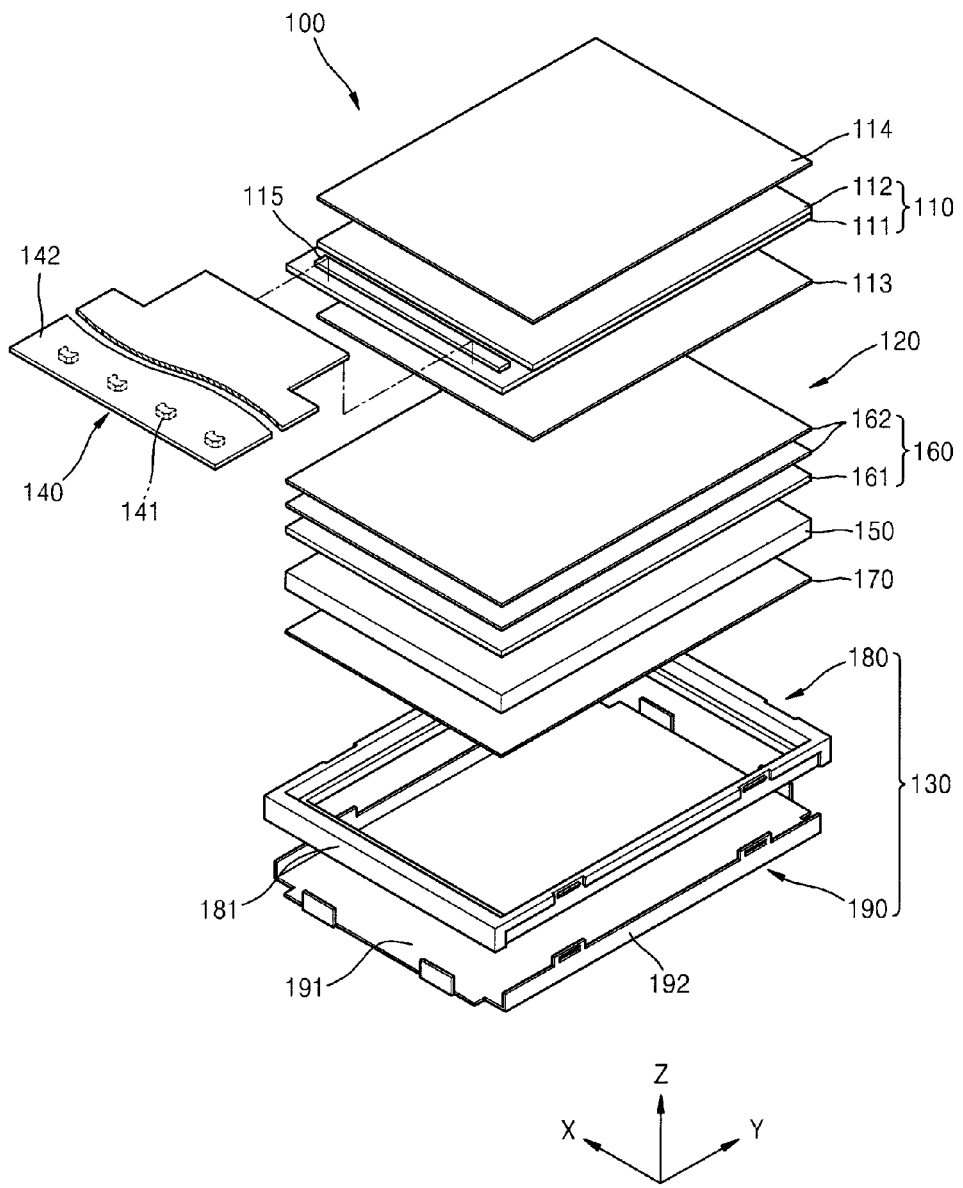
FIG. 1 is a partial perspective view illustrating a display module according to an embodiment of the present invention.

Though the invention allows for various changes and numerous embodiments, only particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first," "second," etc., may be used to describe various components, such components are not limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The display module according to embodiments of the present invention will be described below in more detail with reference to the accompanying drawings. Those components that are the same or are in correspondence are rendered the same reference numeral regardless of the figure number, and redundant explanations are omitted.

Figure 2:
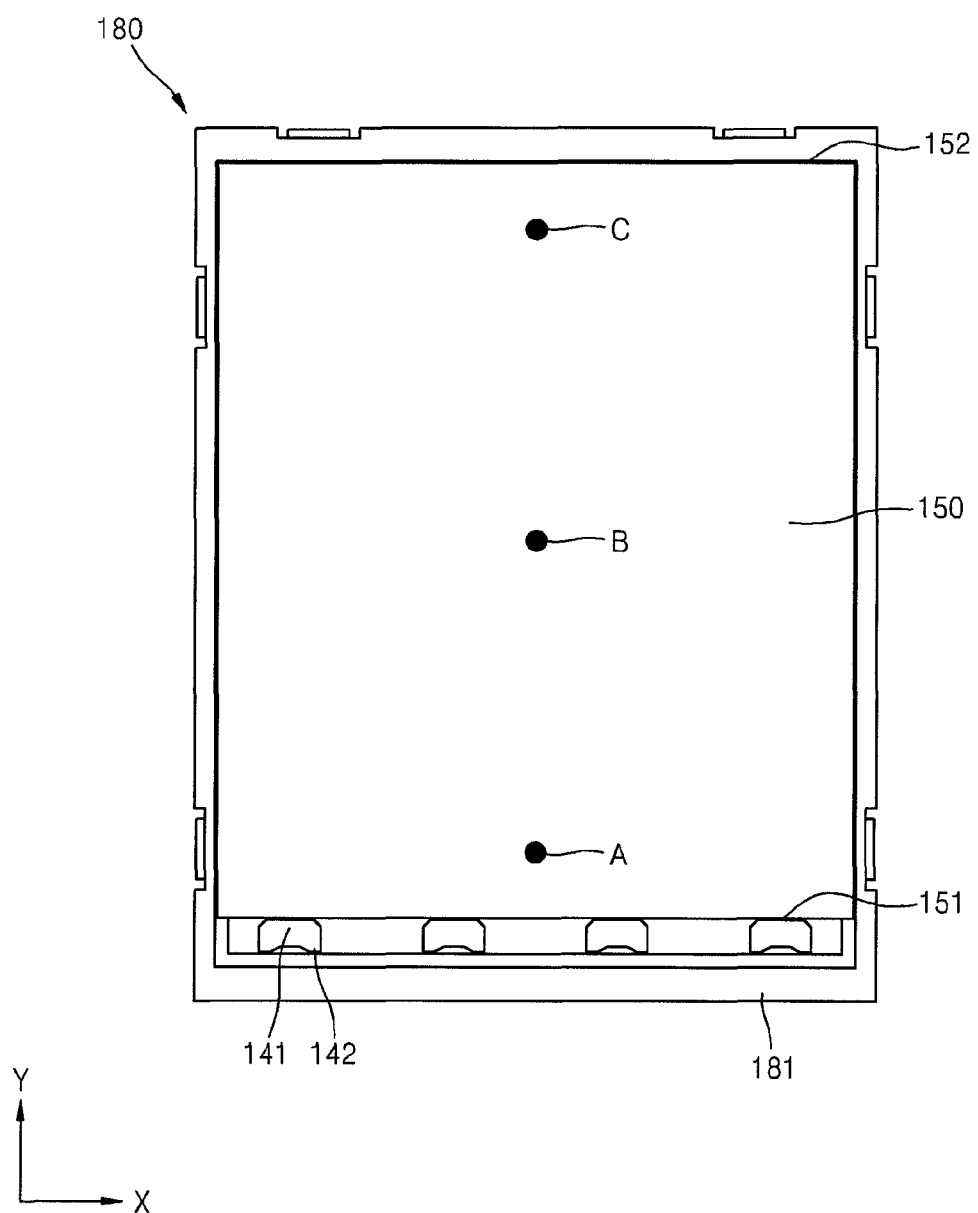
FIG. 2 is a plan view of the display module of FIG. 1, according to an embodiment of the present invention.
Figure 3:
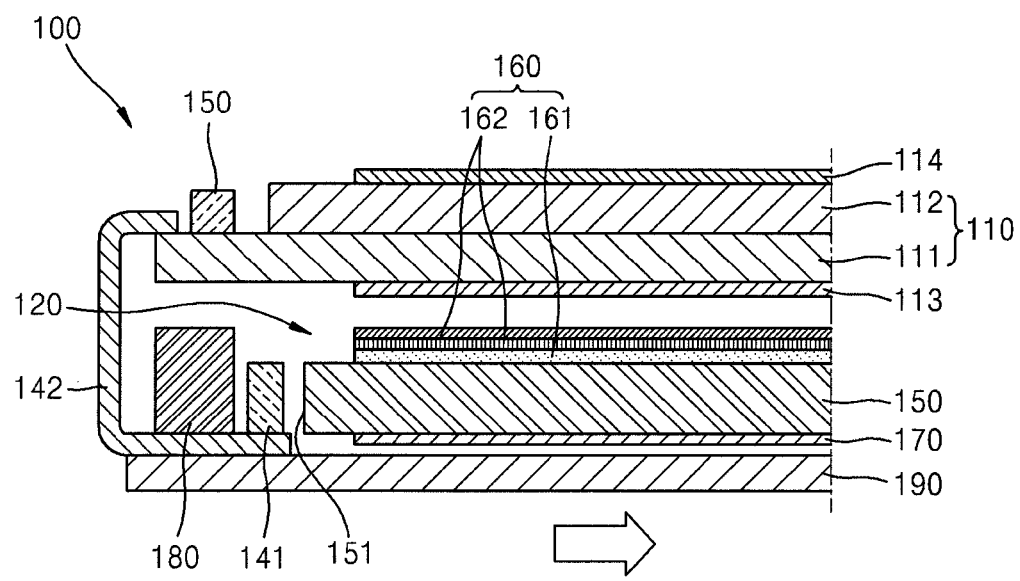
FIG. 3 is a cross-sectional view illustrating a portion of the display module of FIG. 1 in which components thereof are coupled, according to an embodiment of the present invention.

FIG. 1 is a partial perspective view illustrating a display module 100 according to an embodiment of the present invention. FIG. 2 is a plan view of the display module 100, according to an embodiment of the present invention. FIG. 3 is a cross-sectional view illustrating a portion of the display module 100 in which components thereof are coupled, according to an embodiment of the present invention.

Referring to FIGS. 1 through 3, the display module 100 includes a display panel 110, a backlight unit 120, and a housing unit 130.

In one embodiment, the display panel 110 is a liquid crystal display panel, and the display panel 110 includes a first substrate 111, a second substrate 112 disposed to face the first substrate 111, and liquid crystals (not shown) injected between the first substrate 111 and the second substrate 112. However, as long as the display panel 110 is a passive display panel, the display panel 110 is not limited to any one type.

A first polarization plate 113 is attached on an external surface of the first substrate 111, and a second polarization plate 114 is attached on an external surface of the second substrate 112. The first polarization plate 113 polarizes light provided by the backlight unit 120 in a direction perpendicular to a polarization direction to emit the light toward the display panel 110. The second polarization plate 114 polarizes the light that is provided by the display panel 110, in a direction perpendicular to the polarization direction to emit the light to the outside.

A driver IC 115 is mounted on a peripheral portion of the first substrate 111. The driver IC 115 generates a driving signal to operate the display panel 110 according to a voltage applied from the outside. The driver IC 115 is electrically connected to the display panel 110 using a conductive adhesive such as an anisotropic conductive film (ACF).

The backlight unit 120 includes a light source unit 140, a light guide panel 150, a plurality of optical sheets 160, and a reflection sheet 170. The light source unit 140 includes a plurality of light source elements 141 supplying light to a side portion of the light guide panel 150, and a circuit board 142 on which the light source element 141 is mounted.

The light source elements 141 may each be one among a cold cathode fluorescent lamp (CCFL), an external electrode fluorescent lamp (EEFL), or a light emitting diode (LED). In one embodiment, the LED which emits white light may be used as each of the light source elements 141. The number of light source elements 141 may be varied according to a size of the display panel 110 and a desired luminance thereof. The light source elements 141 are spaced apart from one another at predetermined intervals on the circuit board 142.

The circuit board 142 is electrically connected to the edge of the first substrate 111, and transmits an electrical signal to the display panel 110. The circuit board 142 may be a flexible printed circuit (FPC) board or a hard printed circuit board (HPCB). In one embodiment, the FPC board having flexibility may be used as the circuit board 142.

A first end portion of the circuit board 142 is electrically connected to the edge of the first substrate 111. The circuit board 142 is flexible and thus surrounds an external surface of a mold frame 180 overall. A second end portion of the circuit board 142 is disposed below the mold frame 180 facing a bottom portion 191 of a case 190.

In the current embodiment, the circuit board 142 surrounds the external surface of the mold frame 180. However, as long as an end portion of the circuit board 142 is disposed above or below the mold frame 180, the circuit board 142 is not limited to any single structure.

A first side portion 151 of the light guide panel 150 is disposed in front of the light source elements 141. The light source elements 141 are spaced apart from one another at predetermined intervals along a lengthwise direction of a first short side portion 181 of the mold frame 180. In one embodiment, a front surface of the light source elements 141 may be disposed near to the first side portion 151 of the light guide panel 150 in order to reduce luminance dispersion.

The light guide panel 150 is disposed below the display panel 110. The light guide panel 150 provides light emitted from the light source elements 141 to the display panel 110. The light guide panel 150 may be patterned in a predetermined pattern in order to provide a uniform surface light source.

For example, the light guide panel 150 may be formed of a polycarbonate (PC) resin, a polymethylmethacrylate (PMMA) resin, an acrylic resin, or the like having a high rigidity and thus does not easily deform or break, and has a good transmittivity. In order to scatter or diffuse light that is incident on the first side portion 151, the light guide panel 150 may be printed by printing a plurality of light guide pattern portions by using an ink including bead-shaped titanium oxide, bead-shaped glass or bead-shaped acryl.

Besides the printing method, the light guide pattern portions may be formed using a non-printing method, such as a stamping method using a mold or an injection molding method. In one embodiment, the light guide pattern portions may be processed using a laser beam, and as a resin is gasified in this processing, a finely toothed cross-section may be formed in the light guide pattern portions. The finely toothed light guide pattern portions may function as a micro-lens, and thus may expand scattering of light at various angles.

The light guide pattern portions may be in the form of dots, quadrangles, lattices, or a combination of these patterns, formed of grooves carved to a predetermined depth, in the form of dotted lines formed of discontinuous grooves carved to a predetermined depth, or in the form of straight lines formed of continuous grooves. The light guide pattern portions may include grooves that gradually increase in size or whose pitches gradually decrease away from the light source elements 141 in order to increase a light scattering rate or a light diffusion rate.

The optical sheets 160 are interposed between the display panel 110 and the light guide panel 150. The optical sheets 160 comprise at least one sheet to improve luminance efficiency. According to the current embodiment, the optical sheets 160 include a diffusion sheet 161 for diffusing light emitted from the light guide panel 150 and at least one prism sheet 162 disposed on the diffusion sheet 161.

The reflection sheet 170 is installed on a rear surface of the light guide panel 150 disposed opposite to the optical sheets 160. The reflection sheet 170 reflects light that has transmitted through the rear surface of the light guide panel 150, to the display panel 110.

The housing unit 130 includes the mold frame 180 and the case 190.

The mold frame 180 provides space for accommodating the light guide panel 150, the optical sheets 160, and the reflection sheet 170, and is a rectangular frame having an opening in its center. The mold frame 180 is mounted in the case 190.

The case 190 includes a bottom portion 191 on which the mold frame 180 is mounted and a sidewall portion 192 that is bent from an edge of the bottom portion 191 in a vertical direction. The sidewall portion 192 is coupled to the mold frame 180 by a coupling method such as a hook coupling method.

The case 190 is formed of a metal having relatively high rigidity, such as aluminum. Meanwhile, a case (not shown) that is coupled to the case 190 to cover the display panel 110, the backlight unit 120, and the mold frame 180 may be further formed above the case 190.

In the display module 100 having the above-described structure, light that is emitted from the light source elements 141 is incident through the first side portion 151 of the light guide panel 150 facing the light source elements 141. The light incident through the first side portion 151 of the light guide panel 150 is transmitted up to a second side portion 152 of the light guide panel 150.

Due to a trend in which a light guide panel is to be thin and have a large surface area, characteristics of the light guide panel 150 are varied when manufacturing the light guide panel 150 such that discoloration of the light guide panel 150 increases away from the first side portion 151 of the light guide panel 150, which is a portion on which light is incident. Thus, in order to compensate for yellowing of an image color, a chromaticity compensation layer is formed in the backlight unit 120.

Figure 4:
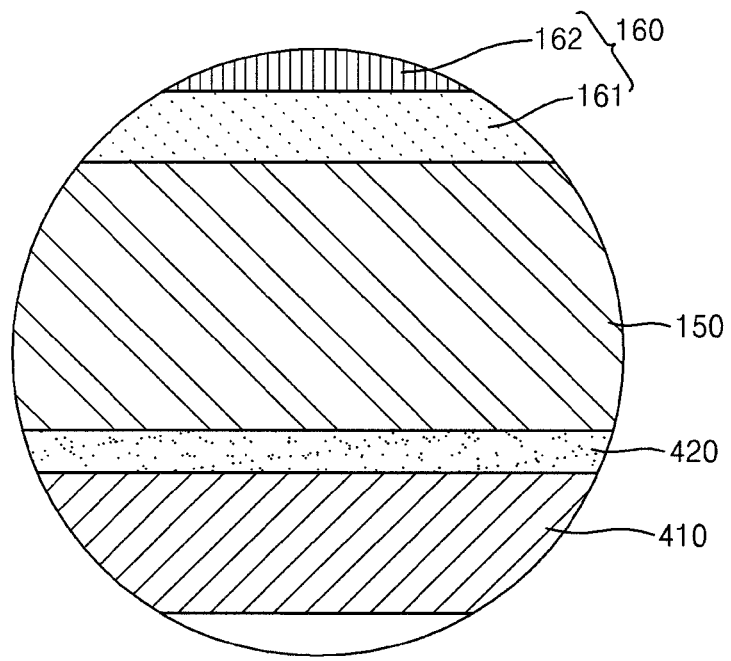
FIG. 4 is an expanded cross-sectional view illustrating a portion of the display module of FIG. 1 where a chromaticity compensation layer is formed, according to an embodiment of the present invention.

FIG. 4 is an expanded cross-sectional view illustrating a portion of the display module where a chromaticity compensation layer 420 is formed, according to an embodiment of the present invention.

Referring to FIG. 4, an optical sheet 160 in which a diffusion sheet 161 and at least one prism sheet 162 attached on an upper surface of the diffusion sheet 161 are stacked is attached on an upper surface of a light guide panel 150. The diffusion sheet 161 diffuses light emitted from the light guide panel 150, and the prism sheet 162 condenses the light in a forward direction. As such, the optical sheet 160 diffuses and condenses light guided by the light guide panel 150 in order for the light to be more uniformly incident on the display panel 10.

A reflection sheet 410 is disposed on a lower surface of the light guide panel 150. The reflection sheet 410 reflects light that has transmitted through below the light guide panel 150 toward the display panel 110 (see FIG. 3) disposed on the optical sheet 160.

The reflection sheet 410 may be formed of a polymer resin, such as a polyethylene terephthalate (PET) resin, an acrylic resin, or a polyolefin resin. In one embodiment, the reflection sheet 410 may be formed of PET. When the reflection sheet 410 is formed of a PET, it contains reflective components such as barium sulfide ($BaSO_4$) or calcium carbonate ($CaCo_3$).

The chromaticity compensation layer 420 is formed between the light guide panel 150 and the reflection sheet 410. The chromaticity compensation layer 420 is formed directly on an upper surface of the reflection sheet 410. The chromaticity compensation layer 420 includes a polymer resin such as PET. An amount of pigments of the chromaticity compensation layer 420 is to be 0.1 wt % or less of the total weight of the chromaticity compensation layer 420. In one embodiment, the chromaticity compensation layer 420 may be formed of particles having a spherical shape of a small diameter as much as possible.

The chromaticity compensation layer 420 includes blue pigments in order to compensate for yellowing of an image occurring away from the incident portion of the first side portion 151 of the light guide panel 150 on which the light is incident. In one embodiment, the particle includes blue pigments.

The chromaticity compensation layer 420 may be formed of a phthalocyanine based blue pigment alone or by mixing a phthalocyanine based blue pigment and a dioxazine pigment. Also, the chromaticity compensation layer 420 may be formed of a blue pigment prepared by mixing a cyan pigment, a violet pigment, a magenta pigment. In one embodiment, a phthalocyanine pigment may be used as the cyan pigment, and a dioxazine pigment may be used as the violet pigment, and a quinacridone pigment may be used as the magenta pigment.

As described above, since the chromaticity compensation layer 420 includes a blue pigment, yellowing of the display module 100 caused due to the characteristics of the light guide panel 150 is compensated for, and variation in the color coordinates of the display module 100 may be improved. That is, as the chromaticity compensation layer 420 is formed between the light guide panel 150 and the reflection sheet 410, yellowing that occurs in an image away from the incident portion of the first side portion 151 of the light guide panel 150 on which light is incident is counterbalanced by the chromaticity compensation layer 420.

Figure 5:
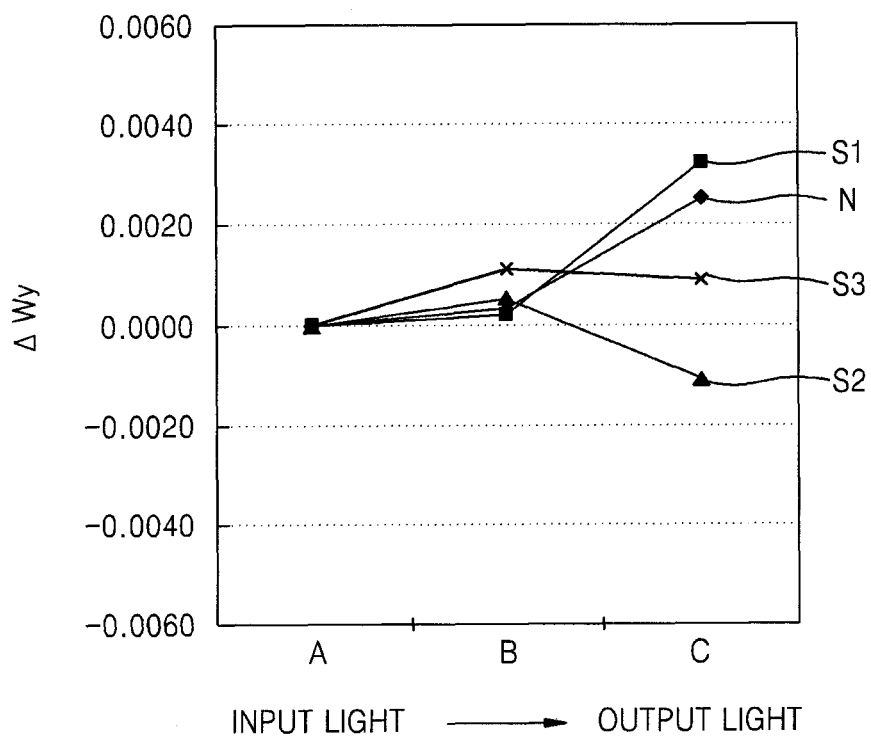
FIG. 5 is a graph illustrating variation in yellowing when using a reflection sheet, according to an embodiment of the present invention.

FIG. 5 is a graph illustrating variation in yellowing when using a reflection sheet according to experiments performed by the present inventor, according to an embodiment of the present invention which is described below.

A, B, and C refer to particular points on the light guide panel 150 of FIG. 2; A is a point relatively near the first side portion 151 of the light guide panel 150 on which light emitted from the light source elements 141 is incident; B is a point near a center portion of the light guide panel 150; and C is a point on a side opposite to the first side portion of the light guide panel 150 on which light is incident. The more toward a "+" direction along a Y-axis (ΔWy), the more yellowing is caused, and the more toward a "−" direction along the Y-axis (ΔWy), the more bluing is caused.

Also, a line N refers to a comparative example in which the backlight unit does not include a chromaticity compensation layer or any one of a light guide panel and a reflection sheet does not include a chromaticity compensation material according to an embodiment of the invention. A line S1 refers to a case in which a blue first polyethylene (PE) is used in a reflection sheet according to an embodiment of the present invention. A line S2 refers to a case in which a blue PET is used in a reflection sheet according to an embodiment of the present invention. A line S3 refers to a case in which a blue second PE is used in a reflection sheet according to an embodiment of the present invention. Here, to the naked eye, a concentration of a blue pigment of the second PE is higher than that of a blue pigment of the first PE, and thus the blue pigment of the second PE looks darker.

Referring to FIG. 5, in comparison with the line N, yellowing is increased by 28% in the line S1, decreased by 144% in the line S2, and decreased by 74% in the line S3. Thus, when a desired reflection sheet obtained by adjusting a concentration of a blue pigment component for each element of the backlight unit 120 is used, a variation amount in color of a light exit portion compared to the side portion 151 may be minimized. In particular, yellowing is reduced the most with respect to the line S2 where the reflection sheet 410 formed of a blue PET is used.

Figure 6:
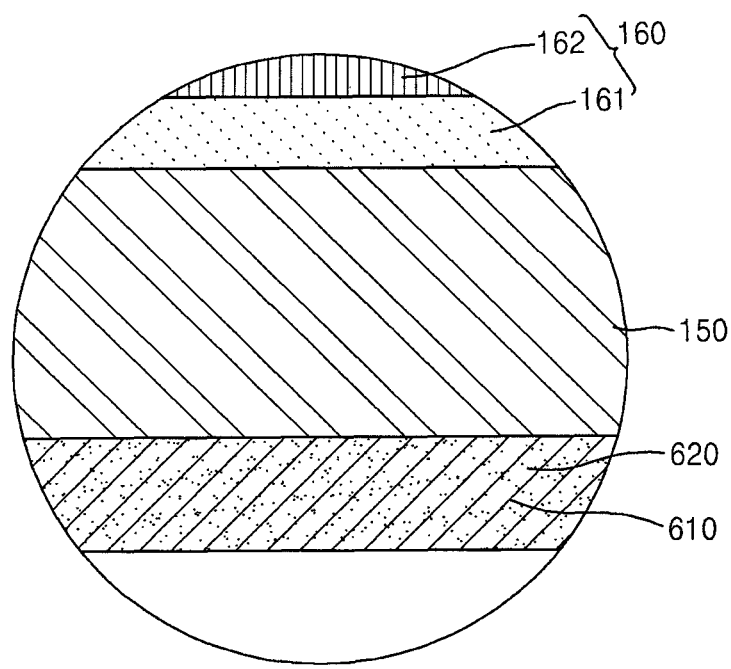
FIG. 6 is a cross-sectional view illustrating a portion in the display module of FIG. 1 where a chromaticity compensation layer is formed, according to another embodiment of the present invention.

FIG. 6 is a cross-sectional view illustrating a portion of the display module where a reflection layer functions as a chromaticity compensation layer, according to an embodiment of the present invention.

A chromaticity compensation material used in this embodiment is identical to that used in the chromaticity compensation layer 420 illustrated in FIG. 4, and thus the structure of a backlight unit including the reflection layer including the chromaticity compensation material will be described only.

Referring to FIG. 6, an optical sheet 160 in which a diffusion sheet 161 and at least one prism sheet 162 attached on an upper surface of the diffusion sheet 161 are stacked is attached on an upper surface of the light guide panel 150. A reflection sheet 610 is disposed over a lower surface of the light guide panel 150. The reflection sheet 610 includes a polymer resin having reflectivity.

In one embodiment, the reflection sheet 610 is formed to function as a chromaticity compensation layer. A raw material of the chromaticity compensation layer is mixed in the reflection sheet 610 when forming the reflection sheet 610. In an embodiment, an amount of pigments of the chromaticity compensation material 620 is about 0.1 wt % of the total weight of the reflection sheet 610.

The chromaticity compensation material 620 includes a blue pigment in order to reduce yellowing of an image at a location away from the incident portion of the first side portion 151 of the light guide panel 150 on which the light is incident. Accordingly, a variation amount in color of a portion opposite to the incident portion of the light guide panel 150 may be minimized.

Figure 7:
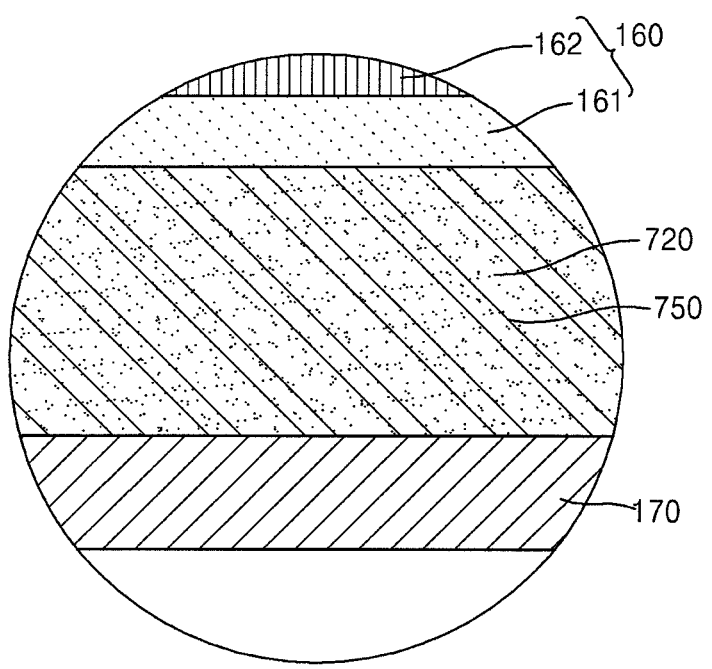
FIG. 7 is a cross-sectional view illustrating a portion in the display module where a chromaticity compensation layer is formed, according to an embodiment of the present invention.

FIG. 7 is a cross-sectional view illustrating a portion in the display module where a light guide panel functions as a chromaticity compensation layer according to an embodiment of the present invention.

Referring to FIG. 7, an optical sheet 160 in which a diffusion sheet 161 and at least one prism sheet 162 attached on an upper surface of the diffusion sheet 161 are stacked is attached on an upper surface of a light guide panel 750. A reflection sheet 170 is disposed on a lower surface of the light guide panel 750.

The light guide panel 750 may be formed of a polycarbonate (PC) resin, a polymethylmethacrylate (PMMA) resin, an acrylic resin, or the like, which has a relatively high rigidity and a relatively good transmittivity. In one embodiment, a light guide panel 750 functions as a chromaticity compensation layer. A raw material of the chromaticity compensation layer is mixed in the light guide panel 750 when manufacturing the light guide panel 750. In one embodiment, an amount of pigments of the chromaticity compensation material 720 is about 0.1 wt % of the total weight of the light guide panel 750.

The chromaticity compensation material 720 includes a blue pigment in order to reduce yellowing. Accordingly, a color uniformity of the display module may be improved. As described above, following effects may be obtained in the display module according to the embodiments of the present invention.

First, a chromaticity compensation layer is formed on or in a reflection sheet, thereby preventing yellowing of an image.

Secondly, a chromaticity compensation layer is formed in a light guide panel, thereby preventing yellowing of an image.

While embodiments of the present invention have been particularly shown and described, it will be understood by those of ordinary skill in the art that various changes in form and details may be made therein without departing from the spirit and scope of the present invention as defined by the following claims.

What is claimed is:

1. A display module comprising:
a display panel configured to display an image; and
a backlight unit comprising a light guide panel configured to guide light to the display panel, a light source configured to supply light to a side of the light guide panel such that light beams from the light source travel in a horizontal direction through the light guide panel and that at least one color component of the light beams would be disproportionately absorbed while light beams are traveling in the horizontal direction,
wherein the backlight unit further comprises a reflection sheet disposed over a rear surface of the light guide panel opposite to the display panel, wherein the reflection sheet is configured such that the disproportionate absorption of the at least one color component of the light beams traveling therethrough is at least partially compensated, and
wherein the reflection sheet comprises a chromaticity compensation material, the chromaticity compensation material comprising a pigment in the amount of about 0.1 weight percent of a total weight of the reflection sheet.

2. The display module of claim 1, wherein the chromaticity compensation layer material comprises a blue pigment.

3. The display module of claim 2, wherein the blue pigment comprises one selected from the group consisting of a phthalocyanine pigment, a mixture of a phthalocyanine pigment and a dioxazine pigment, and a mixture of cyan, violet, and magenta pigments.

4. The display module of claim 3, wherein the cyan pigment comprises a phthalocyanine pigment, and the violet pigment comprises a dioxazine pigment, and the magenta pigment comprises a quinacridone pigment.

5. The display module of claim 1, wherein the reflection sheet is formed of a polyethylene terephthalate.

6. The display module of claim 1, wherein the light guide panel is formed of a polycarbonate.

7. The display module of claim 1, wherein the light source is disposed at a side portion of the light guide panel.

8. The display module of claim 6, wherein the light source comprises a light emitting diode.

9. The display module of claim 1, further comprising at least an optical sheet interposed between the display panel and the light guide panel.

10. The display module of claim 9, wherein the at least an optical sheet comprises a diffusion sheet configured to diffuse light emitted from the light guide panel, and at least one prism sheet that is disposed on the diffusion sheet and is configured to condense light in a forward direction.

11. The display module of claim 1, wherein the display panel is a liquid crystal display panel.

* * * * *